March 15, 1966  M. C. SWEZY ETAL  3,240,455
BRACKET FOR VEHICLE MOUNTED WARNING DEVICE
Filed May 28, 1962  2 Sheets-Sheet 2

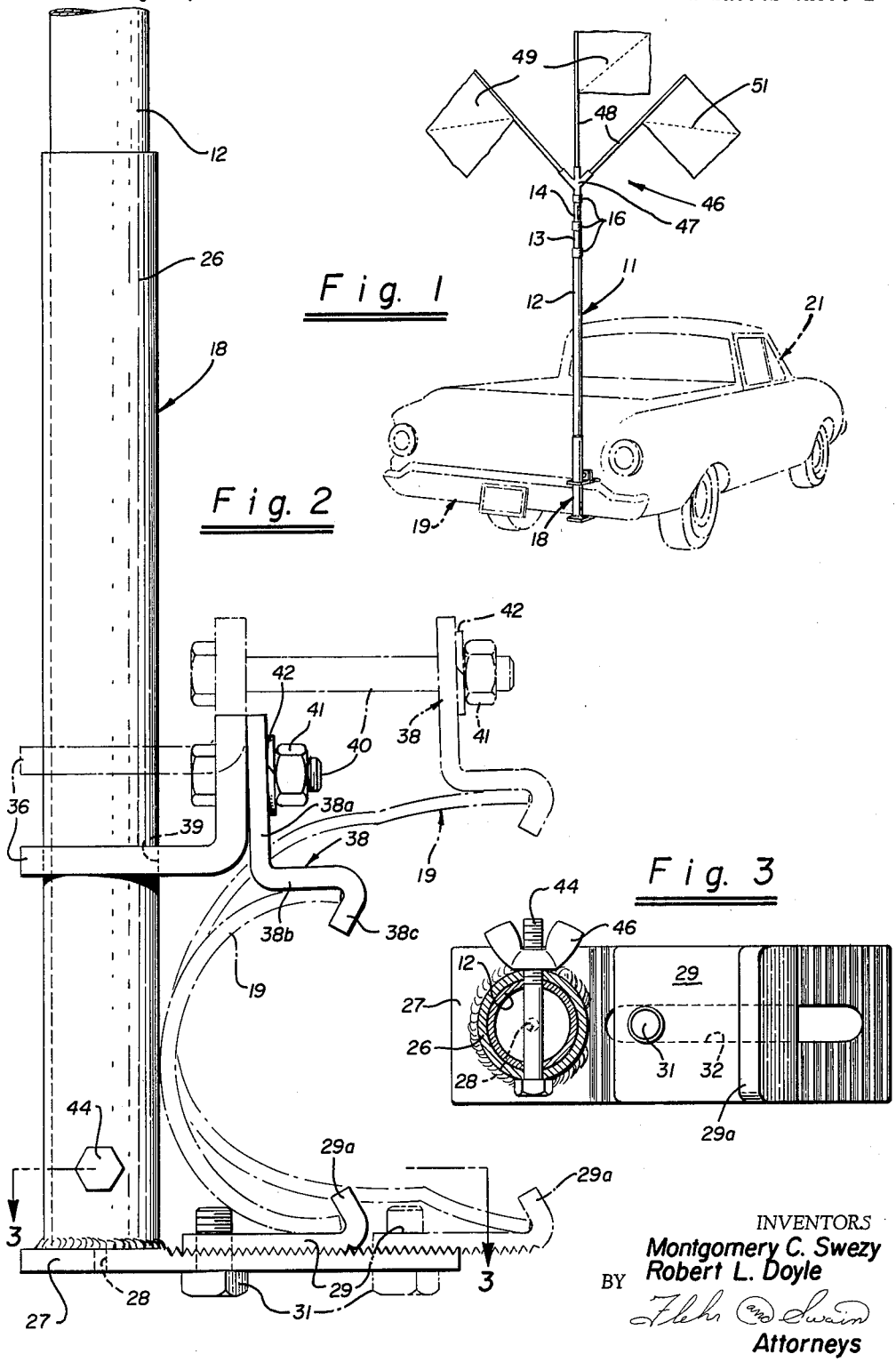

INVENTORS
Montgomery C. Swezy
BY Robert L. Doyle
Attorneys

United States Patent Office 3,240,455
Patented Mar. 15, 1966

3,240,455
BRACKET FOR VEHICLE MOUNTED
WARNING DEVICE
Montgomery C. Swezy and Robert L. Doyle, Palo Alto, Calif., assignors to Western Progress, Inc., Palo Alto, Calif., a corporation of Nevada
Filed May 28, 1962, Ser. No. 197,991
6 Claims. (Cl. 248—43)

This invention relates to a vehicle mounted warning device and a mounting bracket therefor.

At the present time, there is a need for a vehicle mounted warning device which can be utilized by motorists to give a visual indication either during the day or at night that their vehicle has stopped on the highway. At the present time, a suitable warning device is not available. Flares and other devices which have been utilized have been found to be generally unsatisfactory because they are often lying on the ground so that they are not visible to the driver of a vehicle which is immediately behind another vehicle. In addition, such flares are not readily visible during the daytime.

In general, it is an object of the present invention to provide a vehicle mounted warning device which can be utilized for giving daytime and nighttime warnings.

Another object of the invention is to provide a warning device of the above character which can be readily put in use.

Another object of the invention is to provide a warning device of the above character which is relatively economical to manufacture.

Another object of the invention is to provide a warning device of the above character which is very easy to install on the vehicle.

Another object of the invention is to provide a mounting bracket which is particularly adapted for mounting the warning device on the vehicle.

Another object of the invention is to provide a mounting bracket of the above character which is particularly adapted for mounting on the bumper of the vehicle.

Another object of the invention is to provide a mounting bracket of the above character which is readily adjustable so that it can be utilized with different types of bumpers.

Additional objects and features of the invention will appear from the following description in which the prefered embodiments are set forth in detail in conjunction with the accompanying drawings.

Referring to the drawings:

FIGURE 1 is a perspective view of a vehicle with a warning device mounted thereon incorporating our invention with a particular type of mounting bracket.

FIGURE 2 is an enlarged side elevational view of the warning bracket.

FIGURE 3 is a cross-sectional view taken along the line 3—3 of FIGURE 2.

Figure 5:
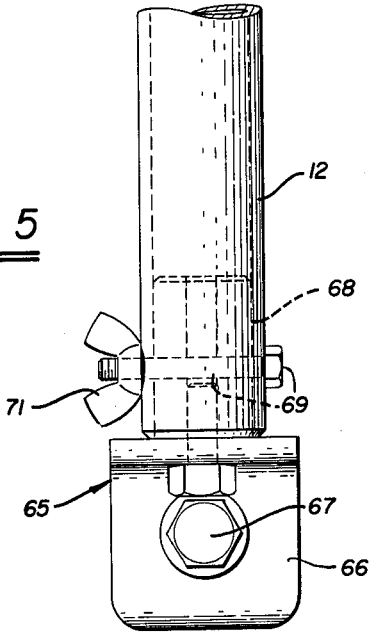
FIGURE 5 is an enlarged detail view of the mounting bracket used in FIGURE 4.

In general, our vehicle mounted warning device consists of a bracket which is adapted to be attached to the vehicle. A substantially vertical telescoping assembly is releasably secured to the bracket and is movable between extended and retracted positions. A signalling or warning device is mounted on the uppermost section of the telescoping assembly. For daytime use, the signalling or warning device consists of a plurality of flags mounted in a particular manner, whereas, for nighttime use, the warning device consists of a large flashing warning or signalling light.

As shown in the drawings, my vehicle mounted warning device consists of a telescoping tube assembly 11 which consists of a plurality of tubular telescoping sections which may be identified as a lower section 12, an intermediate section 13, and an upper section 14. As shown, the intermediate tubular section 13 telescopes into the lower section 12 and the upper section 14 telescopes into the intermediate section 13. Means is provided which includes ferrules 16 for retaining the telescoping section in predetermined extended or retracted positions which is of a type described in Patent No. 2,781,017 and for that reason will not be described in detail.

Bracket means is provided for mounting the telescoping assembly 11 on the vehicle and consists of a bracket 18 which is adapted to be mounted on the bumper 19 of a vehicle 21. The bracket consists of a cylindrical member 26 which normally extends in a substantially vertical direction. Lower securing means is provided on the lower extremity of the member 26 and consists of a plate 27 which has one end secured to the bottom end of the tubular member 26 by suitable means such as welding. It is provided with a drain hole 28 which communicates with the interior of the tubular member 26 as shown. The upper surface of the other or forward end of the plate 27 is serrated as indicated. A toe plate 29 has its lower surface serrated in a similar manner and is adapted to engage the upper surface of the plate 27 as indicated. The toe plate 29 is retained in a predetermined position on the plate 27 by releasably securing means in the form of a cap screw 31 which is threaded into the plate 29 and which extends through an elongate slot 32 which extends longitudinally of the plate 27. The toe plate 29 is provided with an upper and inwardly curved portion 29a which is adapted to grasp the lower edge of the bumper as shown. It is readily apparent that the toe plate 29 can be adjusted longitudinally of the plate member 27 merely by loosening the screw 31, shifting the toe plate to the desired position and then tightening the screw.

Upper retaining means is also provided on the member 26 and consists of an L-shaped member 36 in which one leg is provided with a hole 39 so that the member 36 can be slidably mounted on the tubular member 26 as shown particularly in FIGURE 2. An L-shaped gripping member 38 is releasably secured to the other leg of the L-shaped member 36 by suitable means such as a bolt 40, nut 41 and a lock washer 42. The gripping member 38 is provided with a portion 38a which extends in a substantially vertical direction and a portion 38b which extends in a substantially horizontal direction. It is also provided with a downwardly and inwardly turned portion 38c. This portion is adapted to grip the upper edge of the bumper 19 as indicated in the drawings.

From the foregoing, it can be seen that the upper clamping means can be moved vertically of the tubular member 26 as indicated. Also, if desired, longer bolts can be provided so that the gripping member 38 can reach the top edge of the bumper.

Means is provided for maintaining the telescoping assembly 11 within the bracket and consists of a bolt 44 which extends through a hole in the tubular member 26 and holes provided in the lower tubular member 12 of the telescoping assembly 11. A wing nut 46 is provided for retaining the bolt.

It is readily apparent that the bracket 18 can be located in any desired position on the bumper. For example, as shown in FIGURE 1, it can be located on the right-hand side of the bumper. Alternatively, it can also, if desired, be located on the left-hand side of the bumper. The bracket 18 hereinbefore described can be readily secured to the bumper merely by loosening the bolts 31 and 40 and moving the lower and upper gripping members 29 and 38 to the desired positions and then tightening the bolts. When the bracket is secured in this manner, it will be noted that the telescoping assembly 11 is mounted so that it extends in a substantially vertical direction.

Suitable warning means is provided on the telescoping assembly, and in FIGURE 1, the warning or signalling means takes a form particularly suited for daytime use. Thus, the warning or signalling device 46 consists of a yoke 47 which is mounted on the upper tubular member 14 and in which are removably mounted staffs 48 carrying flags 49. The flags are provided with stiffening members 51 so that they will not hang loosely from the staffs 48.

Use of my vehicle mounted warning device can now be briefly described as follows: To use the warning device, the bracket is first mounted on the bumper as hereinbefore described. The bracket can thereafter normally remain on the vehicle and need not be moved. The telescoping assembly 11 is then inserted in the tubular member 26 and is rotated so that the bolt 44 can extend therethrough and the wing nut 46 threaded onto the nut. Thereafter, the flags 49 can be placed on the yoke 47. The sections 13 and 14 can then be extended so that the flags are raised to the desired height. The flags are normally brightly colored so that they will give adequate warning to oncoming motorists.

It is readily apparent that this warning device is particularly useful for emergency stops of a vehicle on freeways, turnpikes and the like to warn oncoming motorists. The flags are positioned at an elevation above the normal height of vehicles so that they can be readily seen by a relatively large number of cars or vehicles even though they be following each other.

When it is no longer desired to use the warning device, the telescoping sections can be lowered and locked in a retracted position. Thereafter, the flags can be removed and placed in the trunk or suitable compartment in the vehicle. The vehicle can then proceed on its normal path of travel with the telescoping assembly 11 in place. However, if desired, the telescoping assembly 11 can also be readily removed and placed in the trunk or other suitable compartment in the vehicle merely by removing the wing nut 46 and the bolt 44.

For nighttime use, we have found it desirable to provide a head unit 56 (FIGURE 4) which is of the type described in Patent No. 2,975,412 and consists of a ring-like member 57 which carries a pair of lenses 58. A lamp (not shown) is mounted within the head unit and is connected to a flexible cord 59. The cord 59 is connected to the male connector 61 which is received by the female connector 62 mounted below the bumper of the vehicle as indicated. The female connector is connected into the electrical circuitry of the automobile in such a manner that it is connected through the flasher unit normally provided in the automobile for the turn indicators.

Figure 4:
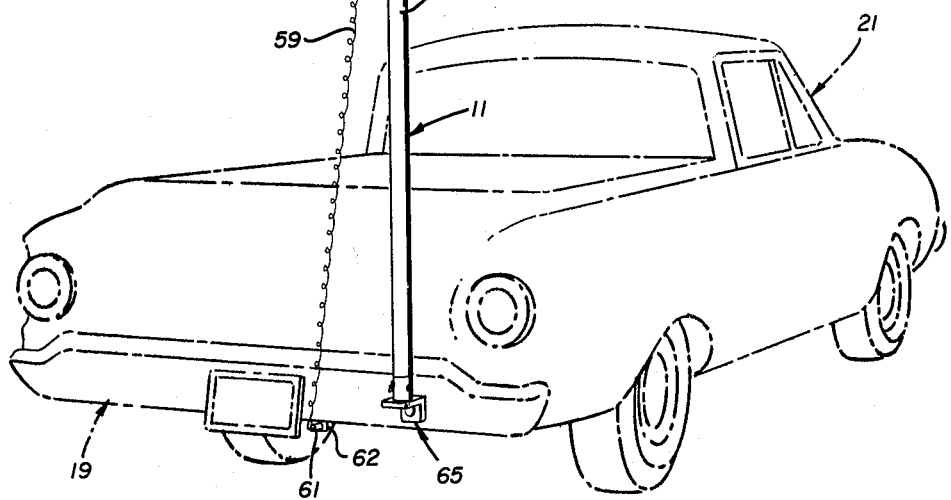
FIGURE 4 is a perspective view of another embodiment of our warning device mounted on a vehicle.

When using the vehicle mounted warning device shown in FIGURE 4, the head unit 56 is attached to the upper telescoping section 14 and then the male connector 61 is inserted into the female connector 62. As soon as this is done, the lamp within the head unit 56 will begin flashing on and off to again warn oncoming vehicles of an emergency road condition. The head unit can be readily raised to the desired position by extending the telescoping sections to the desired height and then locking them in this position.

When it is no longer desired to utilize the warning device, the head unit can be readily detached from the telescoping assembly 11 and the male connector 61 removed, and the head unit with its cord stored in a suitable compartment in the vehicle.

In the embodiment shown in FIGURE 4, a different type of mounting bracket means has been provided in the form of a bracket 65 which consists of an L-shaped member 66. One leg of the member is affixed to the bumper 19 in a suitable manner such as by a bolt 67. The other leg of the bracket extends in a substantially horizontal plane and is provided with an upstanding cylindrical stud 68 over which the lower portion of the tubular section 12 can slide. The telescoping assembly 11 is then held in place by a bolt 69 which extends through the section 12 and the stud 68 and is retained therein by a butterfly nut 71.

The bracket 65 shown in FIGURES 4 and 5 is particularly adapted for use on vehicles which have relatively flat vertical surfaces on their bumpers, whereas the bracket 18 shown in FIGURES 1, 2 and 3 is particularly adapted for use on vehicles having bumpers which are curved and do not have a flat vertical surface.

It is apparent from the foregoing that we have provided a new and improved warning device which is particularly adapted for mounting on vehicles and which is particularly advantageous in warning oncoming motorists either at night or during the day. The warning device is also of the type which can be utilized by law enforcement officers to warn oncoming motorists when they have stopped on the highway.

We claim:

1. In the combination of a bracket and a bumper, said bumper being formed as a laterally extending member having upper and lower edges and in vertical cross-section having a surface disposed outwardly from said upper and lower edges, said bracket comprising a vertical elongate member, lower clamping means secured to the lower extremity of said vertical elongate member and having means secured to the lower edge of said bumper, and upper clamping means slidably mounted on an intermediate portion of said vertical elongate member and having means secured to the upper edge of the bumper, said upper and lower clamping means causing a portion of said vertical elongate member between said lower extremity and said intermediate portion to engage said surface of said bumper whereby said bracket is firmly secured to said bumper with at least three spaced points on said bracket engaging said bumper.

2. A combination as in claim 1 wherein the lower clamping means consists of a plate secured to the lower extremity of the vertical elongate member and having an upper serrated surface, a toe plate having an inwardly curved portion gripping the lower edge of the bumper and having a lower serrated surface engaging the upper serrated surface of the first named plate, the toe plate being shiftable with respect to the first named plate to accommodate different sizes of bumpers and means releasably retaining the toe plate on the first named plate with the serrated surfaces engaging each other.

3. A combination as in claim 1 wherein the upper clamping means includes an L-shaped member slidably mounted on the vertical elongate member, and a gripping member having an inwardly turned portion secured to the upper edge of the bumper and means releasably securing the gripping member to the L-shaped member.

4. In a bracket for use on a bumper formed as a laterally extending member having upper and lower edges and in vertical cross-section having a surface outwardly disposed from said upper and lower edges, an elongate member, lower clamping means secured to the lower extremity of said elongate member and having means adapted to be secured to the lower edge of the bumper, and upper clamping means slidably mounted on an intermediate portion of said elongate member and having means adapted to be secured to the upper edge of said bumper, said upper and lower clamping means being adapted to cause a portion of said elongate member between said lower extremity and said intermediate portion to engage said surface of said bumper whereby said bracket is firmly secured to said bumper with at least three spaced points on said bracket engaging said bumper.

5. A bracket as in claim 4 wherein the lower clamping means consists of a plate secured to the lower extremity of the elongate member and having a serrated upper surface, a toe plate having an inwardly curved portion adapted to be secured to the lower edge of the bumper and having a lower serrated surface engaging the upper serrated surface of the first named plate, the toe plate being shiftable with respect to the first named plate to accomodate different sizes of bumpers, and means releasably securing the toe plate on the first named plate with the serrated surfaces engaging each other.

6. A bracket as in claim 4 wherein the upper clamping means includes an L-shaped member slidably mounted on the tubular member, a gripping member having an inwardly curved portion adapted to engage the upper edge of the bumper and means releasably securing the gripping member to the L-shaped member.

References Cited by the Examiner

UNITED STATES PATENTS

| | | | |
|---|---|---|---|
| 1,496,488 | 6/1924 | Perkins | 240—8.2 |
| 1,678,366 | 7/1928 | Tann | 340—119 |
| 1,684,953 | 9/1928 | Everett | 248—28.9 |
| 1,775,586 | 9/1930 | Becker | 240—8.22 |
| 1,983,174 | 12/1934 | Joerger et al. | 40—138 |
| 2,049,893 | 8/1936 | Chicoine | 248—228 |
| 2,200,168 | 5/1940 | Goldberg. | |
| 2,230,373 | 2/1941 | Briggs et al. | 248—43 |
| 2,290,645 | 7/1942 | Lange | 248—43 |
| 2,358,120 | 9/1944 | Winsick | 248—43 |
| 2,589,747 | 3/1952 | Tedeschi | 340—366 |
| 2,665,418 | 1/1954 | Miller | 340—146 |
| 2,777,415 | 1/1957 | Marten et al. | 116—63 |
| 2,885,539 | 5/1959 | McDermott | 240—53 |
| 2,937,362 | 5/1960 | Hartnett | 340—87 |
| 2,970,289 | 1/1961 | Loomis | 340—84 |
| 2,975,412 | 3/1961 | Fuller et al. | 340—366 |
| 3,100,241 | 8/1963 | Goldstein | 248—43 |

OTHER REFERENCES

Popular Mechanics, volume 100, issue No. 6, December 1953, page 196.

NEIL C. READ, *Primary Examiner.*

ROBERT H. ROSE, *Examiner.*